United States Patent
Kitamura et al.

(10) Patent No.: US 10,639,671 B2
(45) Date of Patent: May 5, 2020

(54) COMPOSITION FOR A ROOFING MATERIAL AND METHOD OF USING THE SAME

(71) Applicants: UNIVERSITI BRUNEI DARUSSALAM, Brunei (BN); PIXELA CORPORATION, Osaka (JP)

(72) Inventors: Toru Kitamura, Osaka-Fu (JP); Nur Fajrini Binti Matjalina, Jln Muara (BN); Nursyahidah Husna Binti Haji Tarip, Tutong (BN); Haji Muhammad Redza Bin Haji Hussin, Berakas (BN); Mohammad Zul Amali Bin Haji Mahri, Kg Sg Liang (BN)

(73) Assignee: Universiti Brunei Darussalam, Brunei Darussalam ( * ) Notice: Subject to any disclaimer, the term of this patent is extended or adjusted under 35 U.S.C. 154(b) by 88 days.

(21) Appl. No.: 14/922,397

(22) PCT Filed: Oct. 26, 2015

(86) PCT No.: PCT/IB2015/058228
§ 371 (c)(1),
(2) Date: Oct. 26, 2015

(87) PCT Pub. No.: WO2016/067174
PCT Pub. Date: May 6, 2016

(65) Prior Publication Data
US 2017/0216878 A1    Aug. 3, 2017

Related U.S. Application Data

(60) Provisional application No. 62/068,800, filed on Oct. 27, 2014.

(51) Int. Cl.
*B05D 5/06* (2006.01)
*B05D 1/02* (2006.01)
(Continued)

(52) U.S. Cl.
CPC ............. *B05D 5/063* (2013.01); *B05D 3/002* (2013.01); *B05D 5/066* (2013.01); *B05D 7/04* (2013.01);
(Continued)

(58) Field of Classification Search
CPC .................................. B05D 1/02; B05D 5/063
See application file for complete search history.

(56) References Cited

U.S. PATENT DOCUMENTS

2010/0190633 A1* 7/2010 Bai ................... B01J 35/004
502/63
2010/0215946 A1* 8/2010 Wensel ................ B29C 43/003
428/323

(Continued)

*Primary Examiner* — Elizabeth A Burkhart
(74) *Attorney, Agent, or Firm* — Geeta Kadambi; Riddhi IP LLC

(57) ABSTRACT

A roofing material composition and a method of applying that roofing material composition using specific angles to deflect infra-red rays and provide aesthetically nice finish is disclosed. The first coat of the roofing material is light in color and the second color may be a light or a dark color. The rough surface is prepared using specific filler, resin and paint to deflect infra-red rays and reduce heating inside a building.

13 Claims, 4 Drawing Sheets

(51) Int. Cl.
*E04D 7/00* (2006.01)
*C09D 5/00* (2006.01)
*C09D 7/40* (2018.01)
*C09D 5/29* (2006.01)
*B05D 3/00* (2006.01)
*B05D 7/04* (2006.01)
*B05D 7/00* (2006.01)

(52) U.S. Cl.
CPC .................. *B05D 7/58* (2013.01); *C09D 5/00* (2013.01); *C09D 5/29* (2013.01); *C09D 7/40* (2018.01); *E04D 7/00* (2013.01); *B05D 1/02* (2013.01); *B05D 5/065* (2013.01); *B05D 7/54* (2013.01)

(56) References Cited

U.S. PATENT DOCUMENTS

| | | | |
|---|---|---|---|
| 2011/0183112 A1* | 7/2011 | Bailey | E04D 1/12 |
| | | | 428/143 |
| 2012/0088071 A1* | 4/2012 | Bailey | E04D 1/26 |
| | | | 428/143 |

* cited by examiner

COMPOSITION FOR A ROOFING MATERIAL AND METHOD OF USING THE SAME

CROSS REFERENCE TO RELATED APPLICATIONS

The instant application claims priority to U.S. Provisional application 62/068,800 filed on 27 Oct. 2014. The U.S. Provisional application 62/068,800 is hereby incorporated by reference in its entireties for all of its teachings.

FIELD OF INVENTION

The instant application discloses a roofing material composition and method of using the same to display multicolored effect and deflect infra-red rays away from roof top.

BACKGROUND

Worldwide the roofs are of dark colors. Ideally if the roof is white then it would be optimal for reflecting infra-red rays and reducing the temperature in the house. However, it is not the preferred method. Global warming has created a challenge to reduce energy conservation and reduce cost of living for aging population. There is need to solve this problem by solving this issue of a better roof top design.

SUMMARY

The instant disclosure describes several embodiments for a composition for roofing material and method of applying the roofing material to the roof to display different reflective effects and colors, minimizing heat absorption onto the roof surface. In one embodiment, a roofing material for reducing the heat and increasing the deflection of the sun rays are described. In another embodiment, a roofing material comprises of filler, resin, pigment, and solvent. The pigment is a combination of one or more chemical ingredients including titanium dioxide, ferrous oxide, ferric oxide, cupric oxide, cuprous oxide, zinc oxide, carbon, nickel oxide, and cobalt oxide. The one or more chemical ingredients are fine particles of solid chemicals having the mean diameter of primary particle 10 nm-200 nm. In one embodiment titanium dioxide is a major ingredient to reflect sunlight IR effectively. In one embodiment, the method of applying the roofing material using specific sequence of steps and specific material is described.

In one embodiment, a roofing material composition is made up of fillers such as sand or clashed mineral or combination thereof. The sand can be silica sand, beach sand, or any other type of sand. In one embodiment the sand is not only the ordinary sand but is any large particles of metal oxide having enough water resistance and resilience against outdoor weathering. The clashed minerals are minerals of small size and include, but not limited to, quartz, granite, basalt, pegmatite and calcite. In one embodiment, the clashed materials include clashed metal oxide rocks with suitable size. The filler, in another embodiment, has a diameter between 0.1 mm and 3.0 mm.

In another embodiment, the resin is used as a component of the roofing material. In one embodiment, the resin/filler weight ratio varies between $1/3$ to $2/3$. The resin includes volatile solvent. In another embodiment resin can be resin mixture that includes resin, solvent, and pigment. In one embodiment, the solvent in resin/filler or resin mixture/filler is less than 30 weight percent as the major volatile ingredients. In an embodiment the resin/filler or resin mixture/filler is applied on the surface and is allowed to get dried. In another embodiment, the non-volatile weight percent that is the weight of the resin/filler or resin mixture/filler after the surface gets dried exceeds 70%. The resin/filler ratio is critical as resin/filler weigh ratio in case of more than $2/3$ the viscosity of this material is inadequate to form high profiled rough surface by spraying. If the resin/filler weight ratio is less than $1/3$ the adhesion of filler particles will decrease and the layer thus formed will be fragile.

In another embodiment, a method of applying the roofing material is described. In yet another embodiment a photocatalytic finish as a last layer for the roofing material is described. Other features will be apparent from the accompanying drawings and from the detailed description that follows.

BRIEF DESCRIPTION OF DRAWINGS

The embodiments of this invention are illustrated by way of example and not limitation in the figures of the accompanying drawings, in which like references indicate similar elements and in which.

Other features of the present embodiments will be apparent from the detailed description that follows.

DESCRIPTION

The instant disclosure describes a novel composition of a roofing material (composition) and the method of applying the composition of the roofing material to the roof top. Applying this composition and sequential method of applying this roofing material and subsequently the paint it deflects infra-red rays from the roof and as a result reduces the heat inside the house/any building.

Figure 1:
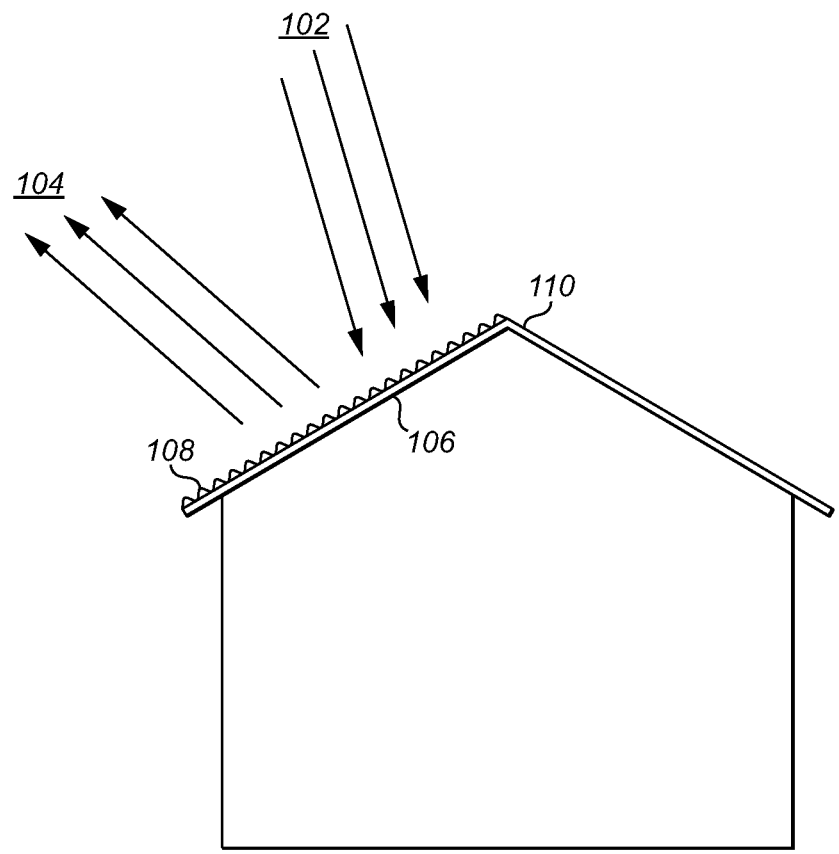
FIG. 1 shows the concept of the invention as illustrated.

We propose a special paint as a roofing material and its application method in achieving the infra-red reflection and maintain dark color tones of conventional roofing. In FIG. 1 solar light 102 hits the roof top and it is reflected 104. It also shows that from 110 angle of viewing the color of the roof top is white. When the roof top 106 that shows the serrated surface and dual paint from the 108 point of viewing the pedestrians or onlooker would see the roof top color as color of choice which may be of dark tone. As shown in FIG. 1, white coloring of the roof materials is the best way to reflect sun light IR and save cooling energy for every buildings and houses but majority of the people don't prefer white for their roofs simply because of the designing aspect. Some sort of dark colored sun light reflective paint have been proposed and actually sold in the market but their reflective capabilities are far from satisfactory.

We propose here a completely innovative idea which combines paints and their method of coating together to solve this problem perfectly, since otherwise it cannot be solved both practically and theoretically from the improvement approach of paint alone. The roofing material and paint as material and method of coating the same produces at least of two color tones on surfaces of roofing materials. The color tone of the roof surface varies with the direction at which the surface is being observed. The coated roofing material appears to show gradated change in color tone from a lighter tone to a darker tone when the observation angle is changed from 0° to 90°, with respect to the normal of the surface. At normal incidence the material appears white from one angle.

The surface of the roofing material is prepared to give edged roughness. Surfaces with edge roughness (rough surface) are coarse to the touch and have an average height difference exceeding 1 mm. This is achieved by painting the roof top with paints mixed with coarse fillers such as sand, silica sand, or generally clashed minerals and combination thereof. The average aggregate size of the filler has mean diameter ranging from 0.1 mm to 3.0 mm. In another embodiment sprinkling course filler on the wet substrate with applied primer is used to prepare this rough surface. In another embodiment, mixture of resin and filler can be sprayed to get more roughness. In another embodiment, resin mixture comprising resin, solvent, and pigment can be used with filler instead of resin. In this case the filler ingredient works not only to give rise to the surface roughness by itself but also to increase the viscosity and stickiness of the rough material as a whole.

Figure 2:
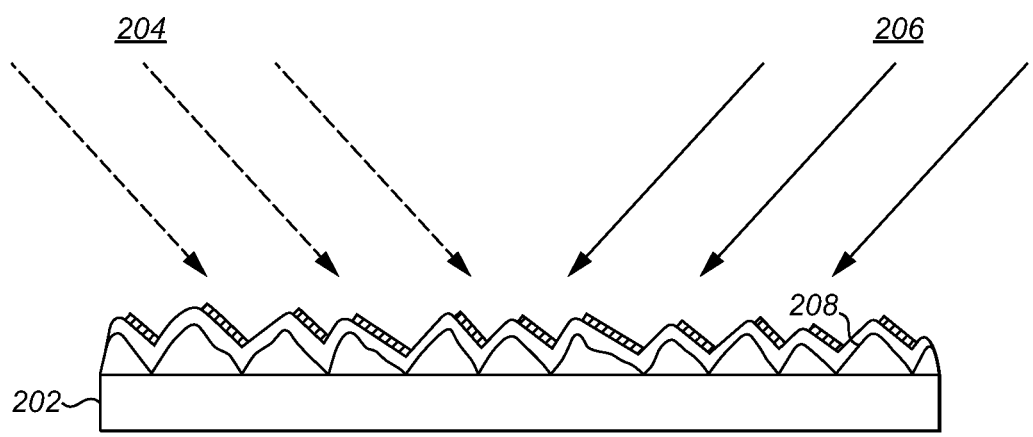
FIG. 2 shows the different angles that can be seen by the observer.

In FIG. 2 shows that the substrate 202 houses the resin and filler layer 208 as an angular layer having two angular surfaces. Due to the inclined angles the observer can see from angle 206 view. However, the sun rays hit the roof at a 204 angular side. FIG. 2 shows a view of the substrate and resin as it is coated on the roof top. The angle of the Sun and the pedestrian view has different views. This unique combination enables the user to depict different colors for the pedestrians and add ambiance to the house decor.

Figure 3:
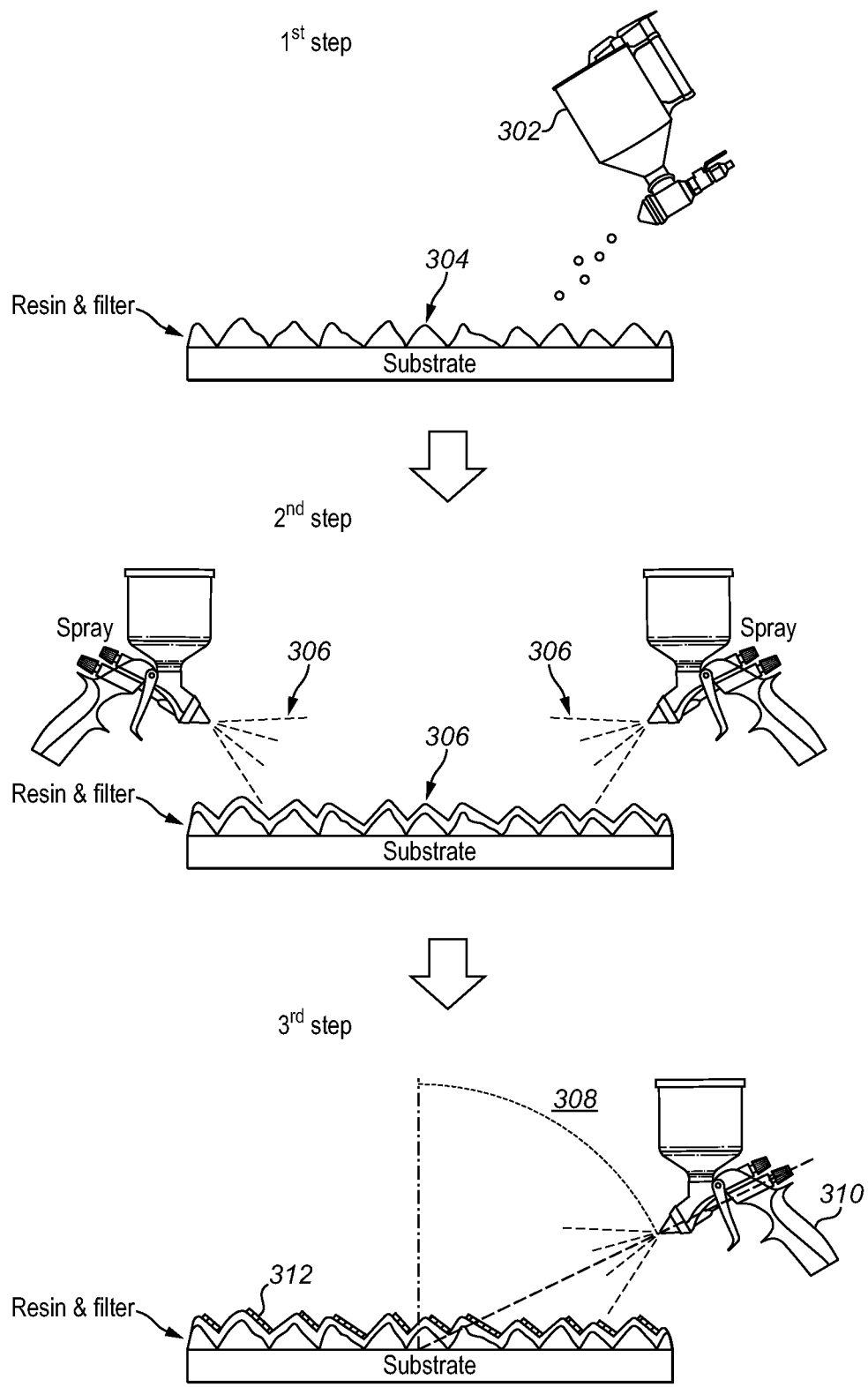
FIG. 3 shows the step wise process flow for the invention.

FIG. 3 shows the three step process of applying the roofing material and paint to a roof of the house. The first step, second and third step are performed one after the other and the optional fourth step may be used for coating a photocatalytic coat. In the first step a high viscosity spray material 302 is applied on both sides of the viewing angle to the roof top to make a serrated surface 304 in form of resin and filler with angles on a substrate. In the second step a white reflective paint 306 is applied on the serrated/rough surface 304. In step 3 the spraying angle 308 is controlled and color paint 310 is applied to one side view only as 312. In another word, the method of making a roofing material comprises of making a rough surface on a substrate that is a first layer for a roof top; spraying a first coat using a first color of a first paint on the rough surface at a specific angle; and spraying a second coat using a second color of a second paint in a second specific direction at a glancing angle of at least 60 degree from the roof top to the rough surface.

The first coat using a first color may be any light color or white. The second color which is a second paint may be any color of user choice. A specific angle is important for the first paint as it covers the entire rough surface. The second angle various and have been described with examples below. The second specific direction is always only one side so it is visible from the pedestrian angle and aesthetics of the roof is visible for all viewers from the road.

The following composition of the roofing material and paint is especially preferable for this purpose to give the paint the high thixotropic nature and hence form a surface feature full of edged roughness, or, many ups and downs, of which mean height difference exceeds 1 mm and this leads to the sharp contrast of colors observed from different angles. The paint is prepared with the following conditions: Mean diameter of indispensable filler contained should be between 0.1 mm and 0.3 mm. Resin/filler or Resin Mixture/filler weight ratio is between ⅓ to ⅔. Weight ratio of resin/filler or resin mixture/filler is an important feature as ratio of more than ⅔ may increase viscosity of the material and may be inadequate to form high profiled rough surface. Similarly, the ratio of less than ⅓ will decrease adhesion of filler particles even with better roughness. However, range of ⅓ to ⅔ is optimum to have good adhesion and good rough surface. Non-volatile weight percent that is after the surface gets dried should exceed 70%. In an embodiment, a white paint coat is applied onto the entire surface. The white paint is applied evenly without any transparency on the whole surface. But if the enough brightness can be obtained in the first step process already, this process can be abbreviated. Spraying the darker colored paint by spraying in only one direction, at a glancing angle greater than 60 degree from the normal of the surface. From the angle of pedestrian side this dark color can be observed. The roof is considerably rough and can be stained quite easily by the rainfall or dust from the practical sense. This problem could be significantly minimized by the application of photocatalytic finish as the fourth step.

Figure 4:
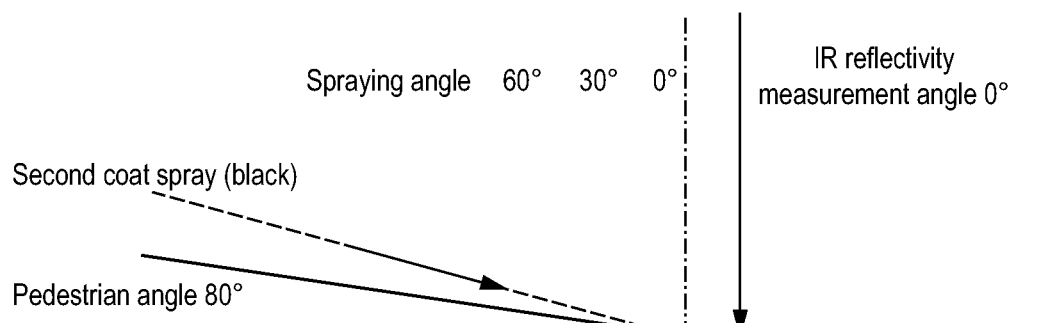
FIG. 4 shows the different angles of the spray technology and its effect.

The coat (paint) and coating method (steps) produces at least of two color tones on flat surfaces of the roofing materials. The color tone of the coating varies with the directions at which the surface is being observed. The coated roofing material appears to show a gradual change in color tone from a lighter tone to a darker tone when the observation angle is changed from low to high with respect to the normal of the surface. At normal incidence the material appears white. Sometimes the appearance changes depending on the angle from the observer. FIG. 4 shows an infra-red reflectivity angle 0°. The spraying angle is between 0-60°. The pedestrian angle is 80°. In a normal roof inclination, the coated roof maintains the appearance of a darker tone, and this provides the aesthetics of conventional roofing, and at the same time, the coated roof has the capability in reflecting infra-red radiation, hence, providing the capability of minimizing heat absorption onto the roof surface. That means the roof looks considerably dark color from the pedestrians observing it from the low angle but effectively reflects sun right IR coming on it from the high altitude, thus leads to the drastic alleviation of sun light heating.

TABLE 1

The effect of different spray angles are shown how much IR reflectance is being observed:

| | Samples | Second Coat Spray Angle From Normal | Substrate Position at Spraying | Appearance from the Pedestrian Angle | IR Reflectance Relative Reflectance of 1200 nm IR at 45° incident angle | Average Temperature/° C. | Appearance |
|---|---|---|---|---|---|---|---|
| A. | Invention Example 1 | 90° | Horizontal | Black | 59 | 35.2 | Mixture of white and black |
| B. | Invention Example 2 | 80° | Horizontal | Black | 65 | 35.6 | Mixture of white and black |
| C. | Invention Example 3 | 70° | Horizontal | Black | 53 | 39.5 | Mixture of white and black |
| D. | Invention Example 4 | 60° | Horizontal | Black | 38 | 39.7 | Mixture of white and black |
| E. | Invention Example 5 | 50° | Horizontal | Black | 37 | 40.9 | Mixture of white and black |
| F. | Invention Example 6 | 40° | Horizontal | Black | 25 | 40.2 | Mixture of white and black |
| G. | Invention Example 7 | 30° | Horizontal | Black | 22 | 40.5 | Mixture of white and black |
| H. | Comparative Example 1 | White Smooth; wholly pure white coated cement board | | White | — | 33.7 | White |
| I. | Comparative Example 2 | White Rough (no 2$^{nd}$ coating applied) | | White | 100 (Standard) | 34.4 | White |
| J. | Comparative Example 3 | Black Smooth; conventional asphalt single roof sheet | | Black | — | 49.6 | Black |
| K. | Comparative Example 4 | Black Rough (0°) | | Black | 15 | 48.0 | Black |

Table 1 shows a comparison of samples A to G with K depicts the importance of spray angle which should be kept at more than 60° glancing angle. If the glancing angle is less than 60 degree then it tends be darker and so will decrease the amount of white color and will in turn decrease the polarization. The table also shows values and comparison of samples A through G and K that depicts the additional effect of spraying angle to the average temperature underneath the substrate. The average temperature decreases as second coat spray angle is increased. Comparison of samples A to G with J depicts the superiority of this invention to conventional roofing material. The average temperature underneath substrate of samples A through G are lower compared in comparison with sample J; of the conventional black smooth asphalt coat on the roof. This indicates that samples A to G have better thermo-shield property. Sample I shows the lowest temperature reading compared to other samples. This is also especially true for spraying angle at 90° (sample A) and 80° (sample B). The average temperature in sample A and B is very close to comparative sample I which is standard conventional complete white surface. Therefore, sample A and sample B with 90 degree and 80 degree second coat spray angle from normal respectively shows better and close performance with polarization effect in comparison to standard surface using complete white color.

Figure 5:
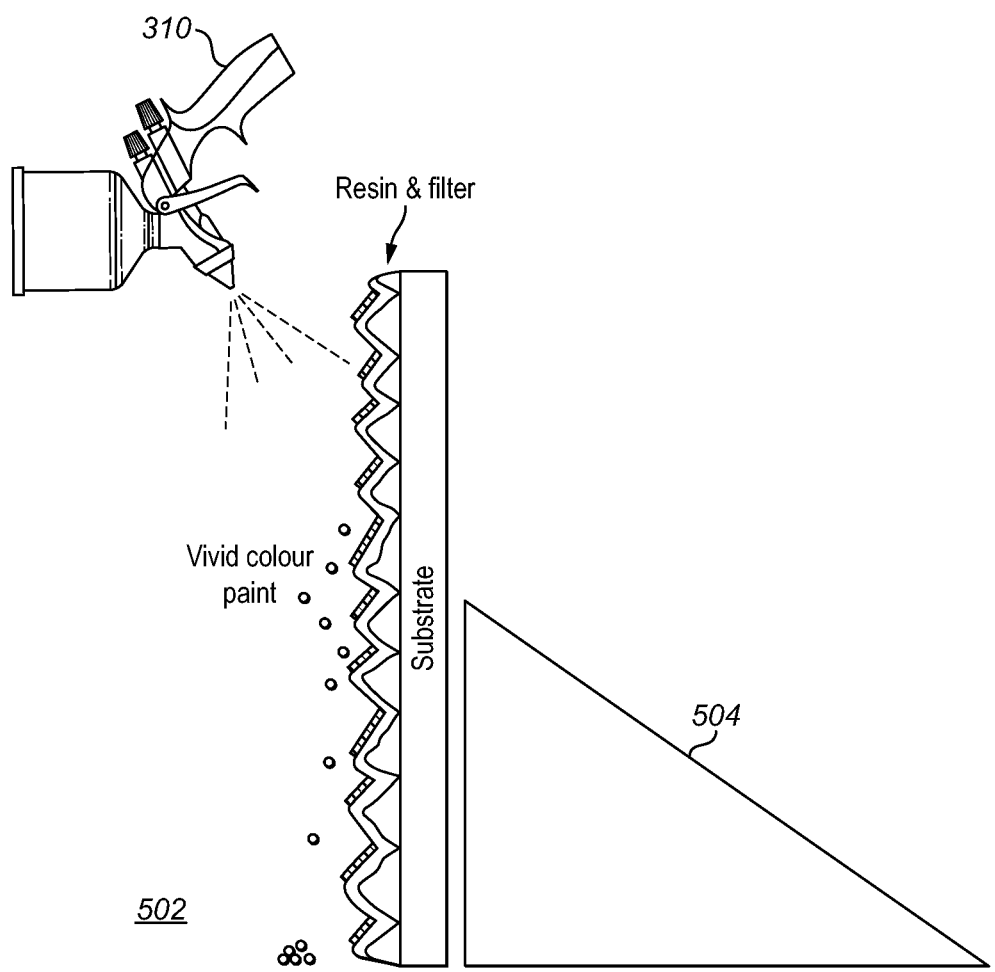
FIG. 5 shows the details effect of spraying angle and reflectivity of the spraying angle of the paint.

FIG. 5 shows the vertical application of the second paint coat and its effect. If the titling angle 504 of the roof surface is at 90° then the excess spray mist 502 would fall way from the light colored surface and would not stain that part. This suggests another angle at which the roof top may be colored to avoid mixing of the surface color and obtain a distinct color demarcation.

Figure 6:
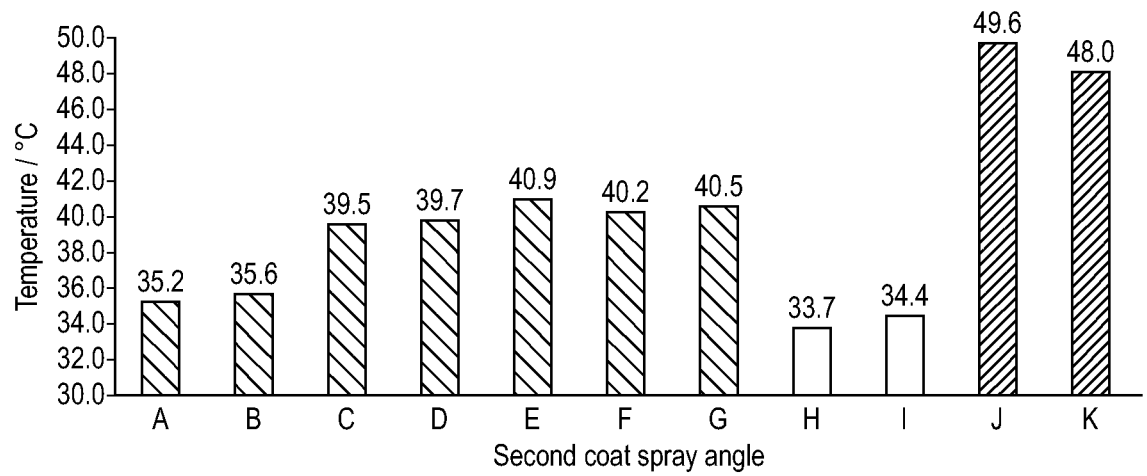
FIG. 6 shows the average temperature reading against angle of applications of paint.

FIG. 6 shows average temperature variations against angle of applications. Samples A through G shows that there is an increase in temperature reading as the second coat spray angle is decreased. However, there is a saturation point where the temperature remains relatively constant at approximately 40° for samples D, E, F and G. Second spray angle lower than 60 degrees reads an average temperature of 40.5 degrees Celsius. There is no significant difference in the temperature observed if the second coat spray angle is 30 degrees, 40 degrees and 50 degrees.

Figure 7:
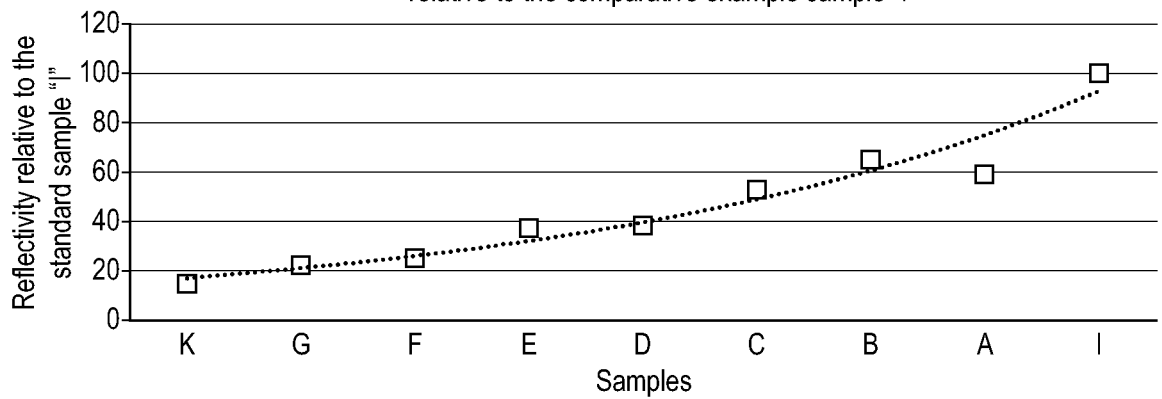
FIG. 7 shows the shows the comparison of reflectance amongst various samples.

FIG. 7 shows reflectance of various examples compared to sample "I". Table 2 and FIG. 7 shows that there is an increase in the relative reflectance of IR at wavelength 1200 nm. The graph shows relative reflectance of IR for samples A to G, I, and K.

TABLE 2 shows that there is an increase in the relative reflectance of the samples as the second coat spray angle increase.

| Second Coat spray angle from normal | Relative reflectance at 45° incident angle |
|---|---|
| 90° | 59 |
| 80° | 65 |
| 70° | 53 |
| 60° | 38 |
| 50° | 37 |
| 40° | 25 |
| 30° | 22 |
| 0° | 15 |

In one aspect of the invention the method of using the roofing material is series of steps that uses a specific combination of resin or resin mixture with filler to create a rough edged surface on the roof with a two color roof. The two color roof deflects most of the infra-red rays of the Sun and makes the house cooler. These types of roofing material can be used for any type of roof where there is extreme heat and/or shortage of power to cool the interior of a building.

Although the present embodiments have been described with reference to specific example embodiments, it will be evident that various modifications and changes may be made to these embodiments without departing from the broader spirit and scope of the various embodiments.

What is claimed is:

1. The method of making a roofing material, comprising:
    making a rough surface made of a filler, resin and paint on a substrate that is a first layer for a roof top, wherein the filler is at least one of a sand, silica sand, clashed minerals and combination thereof,
    spraying a first coat using a first color of a first paint on the entire rough surface at a specific angle;
    spraying a second coat using a second color of a second paint in a second specific direction at a glancing angle of at least 60 degree from the roof top to the rough surface; and
    applying layer of a photo-catalytic finish to the roofing material.

2. The method of claim 1, wherein the rough surface comprising of different peaks with average peak difference being at least 1 mm.

3. The method of claim 1, wherein the rough surface is being colored based on user preferences for multi-color effects.

4. The method of claim 1, wherein the application of second color producing the multi-color effects, wherein the multi-color effect comprising of change in a color tone from a first color to a second color when observation angle is changed from 0 to 90° with respect to a normal flat surface.

5. The method of claim 1, wherein the first color is a light color.

6. The method of claim 1, wherein the second color is a dark color.

7. The method of claim 1, wherein the first coat is not transparent.

8. The method of claim 1, wherein the rough surface at normal incidence appears to be the first color.

9. The method of claim 1, wherein the roofing material reflects an infra-red radiation.

10. The method of claim 1, further comprising:
    removing excess first color by positioning the rough surface in a vertical to upside-down position.

11. The method of claim 1, further comprising
    removing excess second color by positioning the rough surface to a vertical to upside-down position.

12. The method of claim 1, wherein
    a non-volatile weight percent which is a weight of the resin/filler or resin mixture/filler after the rough surface gets dried exceeds 70%; and
    the first paint and the second paint is applied to obtain a color toned roof with a rough surface.

13. The method of claim 1, wherein the filler has a mean diameter between 0.1 mm and 0.3 mm; and wherein the resin and the filler, wherein weight ratio of the resin and the filler is between 1/3 and 2/3.

* * * * *